June 19, 1962 O. B. WILLCOX 3,039,849
ALUMINUM OXIDE PRODUCTION
Filed June 5, 1957
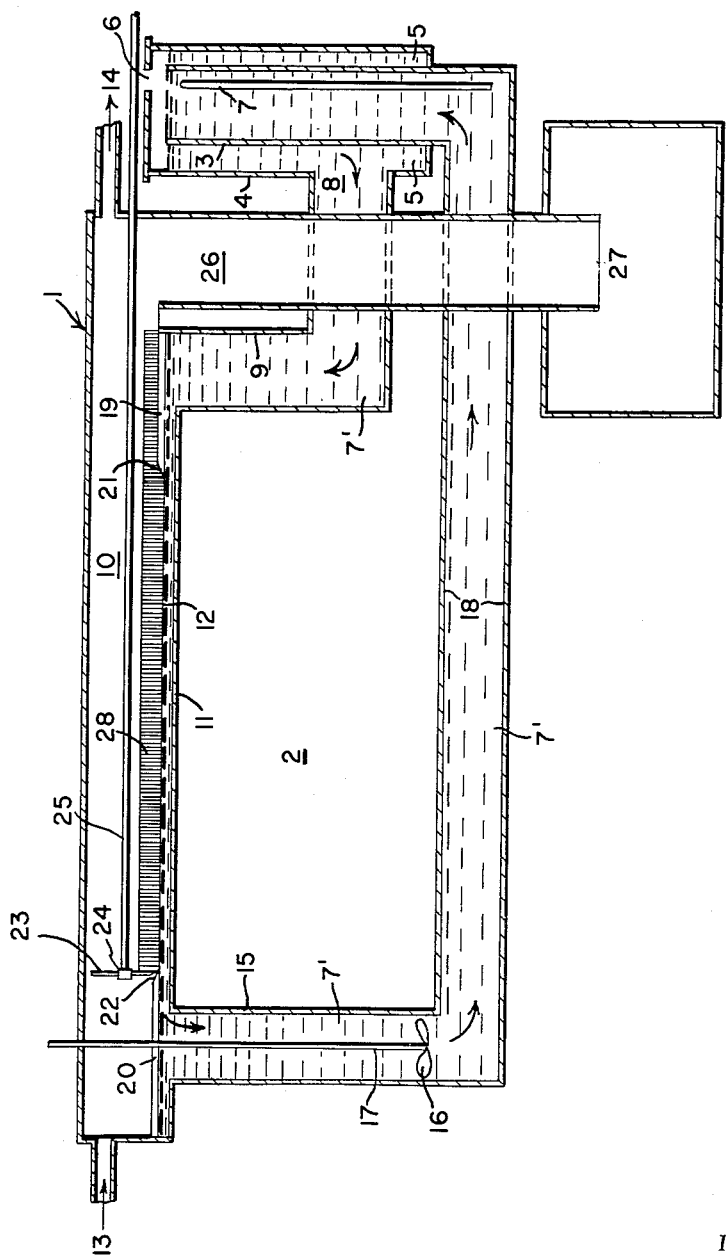
INVENTOR
OSWIN B. WILLCOX
BY
ATTORNEY United States Patent Office 3,039,849
Patented June 19, 1962

3,039,849
ALUMINUM OXIDE PRODUCTION
Oswin B. Wilcox, Wilmington, Del., assignor to E. I. du Pont de Nemours and Company, Wilmington, Del., a corporation of Delaware
Filed June 5, 1957, Ser. No. 663,829
5 Claims. (Cl. 23—141)

This invention relates to novel, superfine alumina products and to new and useful methods for their continuous manufacture. More particularly, it relates to the production of amorphous, microfibrous alumina products characterized by extremely small primary particle size and very low bulk density and adapted to be readily compacted into structurally stable masses.

The production of alumina ($Al_2O_3$) in heterogeneous, grossly fibrous and extremely fragile state is already known. Thus, a light, fragile mass form of the product results when amalgamated aluminum is slowly oxidized to exhaustion with air. A white powder or filamentous form, likewise devoid of structural strength, results when aluminum is contacted with mercuric oxide in the presence of water. When aluminum is oxidized with air over an amalgam formed by retaining a sheet of aluminum under a layer of mercury, the white, cottony product is made up of parallel fibers, perpendicular to the surface of the mercury and is very low in density (less than .1 pound per cubic foot), lacks coherency and cannot be subjected to any cross-cutting action. When water vapor is bubbled through a liquid amalgam of mercury maintained in a heated reaction zone and the product obtained is calcined in air to 300–500° C., the resulting material has an average particle size of 1–5 microns, is devoid of fibrous characteristics, markedly crumbles and powders when compacted and exhibits bulking values (about 1–5 pounds per cubic foot). All of these products, when examined under the electromicroscope, are nonmicrofibrous.

It is among the objects of this invention to provide a new, outstandingly useful form of finely divided, microfibrous alumina, and novel methods for its continuous production. A further object is to provide an amorphous, microfibrous alumina intermediate having extremely small particle size, of low bulk density, high seat insulating value and readily compactable into desired, structurally coherent, stable masses. Other objects will be apparent from the ensuing description and accompanying drawings wherein a vertical, sectional, side elevational view is shown of one form of apparatus in which the invention can be carried out.

The novel microfibrous alumina product of this invention is prepared by reacting at an elevated temperature and within a suitable reaction zone a flowing, liquid stream of a relatively dilute aluminum amalgam maintained at a substantially constant aluminum concentration, with a flowing stream of an oxygen- and moisture-containing gas and while a layer of a coherent, fibrous alumina intermediate is interposed between said flowing reactant streams, and thereafter recovering the finely divided microfibrous alumina product.

More specifically, pure, microfibrous alumina is prepared by forming within a closed reaction zone maintained at from 100–200° C. and upon a continuously flowing stream of liquid amalgam having a substantially constant dissolved aluminum content of from .005 to .03%, a coherent, sheet or mat-like body of fibrous alumina intermediate, reacting said amalgam stream with a moisture-containing oxidizing gas being simultaneously charged through said zone and over said alumina intermediate, intermittently withdrawing the microfibrous alumina reaction mass which forms in said zone, subjecting said mass to heat treatment at from about 750–950° C. in the presence of air to dissociate and remove therefrom occluded mercury-oxygen compounds, and recovering the pure amorphous, microfibrous alumina product thus obtained.

Referring to the drawing, there is shown a corrosion-resistant or other type of useful metal reactor 1 having a heating chamber 2 containing a conventional burner or other heat source (not shown) whereby the reactor and its associated parts can be maintained at any desired temperature. An upright, open-ended dissolver or overflow tank 3, housed within a receiving vessel 4 having a bottom portion 5, is disposed on one end of the reactor, an inlet 6 having a removable cover (not shown) being provided in the top of the vessel 4 for charging sheet or other solid forms of aluminum metal 7 to the dissolver 3 to form or replenish the supply of aluminum in the liquid amalgam 7' maintained in the system. An outlet 8 is positioned in the lower portion of the vessel 4, said outlet being in open communication with a conduit 9 which communicates with an elongated reaction zone 10 positioned in the upper part of the reactor. The bottom of the reaction zone 10 comprises a horizontal, preferably trough-shaped, steel or other desired metal heat transfer surface 11 and also forms the upper or roof section of the heating chamber 2. An inlet 13 is formed in the reaction zone through which an oxidizing gas mixture can be charged continuously to said zone while an outlet 14 is also provided therein through which reaction and other product gases can be readily exited therefrom and from the system. A conduit 15 is disposed at an end portion opposite to that in which the condiut 9 is situated and is provided with an impeller element 16, secured to a shaft 17, adapted to be driven by a motor (no shown). The conduit 15 communicates with a bottom conduit 18 and the latter, in turn, communicates with the bottom of the dissolver 3. The dissolver 3, vessel 4, conduit 9, reaction zone 10 and conduits 15 and 18 are in open communication with each other whereby continuous circulation of amalgam through each and in the form of a moving film or sheet 12 in the reaction zone can be readily effected. Suitably mounted at opposite ends of the reaction zone 10 and at points immediately above the outlet of conduit 9, the inlet of conduit 15, the level of the amalgam 7' present in said conduits are metal guide plates 19 and 20 with the edges 21 and 22 suitably beveled, as shown. Cooperatively disposed for reciprocal movement through the reaction zone over said guide plates and the amalgam stream 12 in that zone is a scraper element 23 with a ratchet joint 24 and a shaft 25 adapted to be manually or mechanically actuated. Outlet chute 26 is provided through which solid reaction products formed in the reaction zone 10 can be readily withdrawn for discharge into an intermediate product collector 27.

In producing the novel microfibrous alumina product of this invention, utilizing the described closed reactor apparatus, said reactor is first heated by furnacing means 2 to a temperature ranging from about 100–200° C. It is then charged with a relatively dilute liquid amalgam 7', the aluminum concentration of which ranges from at least .003% and not to exceed 0.2% by weight, and preferably is from .005% to .03% by weight. The amount of non-saturated liquid amalgam so charged should be sufficient to provide a flowing sheet 12 of about ⅛" thickness in the reaction zone 10, and the level of said amalgam in said zone is conveniently controlled by the liquid level maintained in the system. If desired, the amalgam can be directly formed in the system by adding sufficient pure aluminum as sheet, rod or scrap through the reactor inlet 6 for passage to the dissolver 3 wherein it can be contacted with mercury maintained preferably between 100° and 200° C. although up to the boiling point of mercury can be used. In such event, the amalgamation is preferably carried out at the same temperature prevailing in the reaction zone during the oxidation reaction, i.e., from about 100–200° C. whereby additional heating devices or controls will not be necessary and simplification of the operation with the maintenance of relatively constant conditions will be had. Upon a sufficient quantity of amalgam being present, circulation of the amalgam charge through the system is undertaken by means of the impeller 16 which is operated at a controlled speed adequate to provide and maintain a relatively constant lineal velocity of the sheet 12 of from .05 to 55 and preferably from .1–5 feet per second. The amalgam flow thus provided for passes from the dissolver 3 through tank 4, conduit 9, reaction zone 10 and conduits 15 and 18, with its passage through zone 10 being in the form of continuous, unbroken sheeted stream 12. An oxygen- and moisture-bearing oxidizing gas, containing from 10–99% by volume of oxygen and from 1–20% by volume of $H_2O$, is thereupon charged for continuous flow through reaction zone inlet 13 for passage over and in contact with the surfaces of the amalgam stream 12 and in a direction countercurrent to the flow of that stream. A coherent mass of blanketing, microfibrous alumina intermediate 28 quickly forms over the stream, which mass must remain in direct contact with the amalgam for at least three seconds (shorter periods produce a nonfibrous, noncompactable product at low pressures) and until said mass is made up of parallel fibrils growing vertically from the supporting stream surface. The mass is then allowed to remain undisturbed for about 2–5 minutes and until its size increases to from about 2 to 10 millimeters thickness. Regulation of this growing period in respect to time is effected by manually or mechanically removing the mass intermittently from the reaction surface of the moving stream 12 and from the reaction zone 10 by scraper 22. As already noted, the scraper is provided with a ratchet type joint 24 which permits the scraping action to be accomplished while drawing the scraper through the zone 10 in a direction opposite to the amalgam flow. In this manner, the intermediate 28 is pulled against the pressure of the stream and is broken into many small varied size sections or chunks which retain the parallel fibrous character of the original mass. The size of these sections will vary from approximately 5 to 10 square millimeters depending upon such factors as the rate of removal, reaction time, temperature, blanket thickness, etc. In removing the reaction mass from the zone 10, the chunks are raked into the outlet chute 26 for passage to the intermediate product collector 27 from which they can be intermittently or continuously withdrawn for desired use, or passed to subsequent purification and opacification operations.

The raw, amorphous microfibrous intermediate product obtained contains associated or occluded mercury-oxide compounds and is useful in such applications as a catalyst base, as an adsorbent, as a mercurial base in medicinal salves or other mercurial preparations, and as a seed disinfectant or insecticidal composition. An appreciable portion of the occluded mercury and oygen compounds present are associated on the surface of the alumina as loosely held mercury oxide which can be decomposed and removed by heating the alumina in air to temperatures above 500° C. and preferably from about 750–950° C. for a period of 30 minutes or longer in a vaporizer or other useful vessel from which mercury volatilized can be recovered and returned to the system for reuse. Initially, the intermediate will contain from 5–40% mercury in the form of oxides of mercury. After heating in air for from 5–30 minutes at 650° C., about 5–30% of such mercury compounds will remain in the alumina and the product remains relatively stable at that temperature and even when subjected to such heating under a vacuum of 5 millimeters. Its fibers will range from less than .05 micron to .15 micron in diameter, and will be in the order of about 40 microns to about 20 millimeters in length, being parallel to each other in a structurally stable coherent mass having a density of 2 to 20 pounds per cubic foot. Heating at 650° C. in air removes the yellow or orange color to provide a colorless, dehydrated product, indicating that some unassociated or occluded mercury oxide was originally present. Except for color, heat treatment does not impart any visible change in the physical appearance of the alumina. Advantageously, the product retains its parallel, fibrous structure, low bulking value, and high strength characteristics after compacting at 15–100 pounds per square inch or higher.

The pure alumina microfibrous product obtained from the calcination treatment at temperatures of from 750–950° C. is completely amorphous in character, exhibits no pattern upon subjection to X-ray or electron diffractions and possesses no hiding or covering power in paint or other coating composition vehicles. Because of its low bulk density and fibrous structure, it is highly useful as an insulating material. When compacted, it has structural strength, with elasticity and is not readily broken so that it is useful as a structural and insulating filler for evacuated foil or plastic-covered insulation members. The fibrous material has a high surface area (about 200 square meters per gram) rendering it ideal as an absorbent for many substances including water, alcohol, oils, hydrocarbons, etc., and especially in chromatographic purification and separation systems. With its relatively high surface area, inertness and amorphous nature, the product is, as already stated, highly useful as a catalyst base.

The pure alumina product resulting from the calcination treatment at a temperature above 750° C. to remove occluded and associated mercury-oxygen compounds, as noted, is granular in type and comprises particles of pure amorphous alumina in the form of parallelly arranged microfibers exhibiting a very low bulk density (in the range of 1–5#/cubic foot). This microfibrous $Al_2O_3$ product consists of fibrils or microfibers of from .05 to .15 micron diameter and more than about 30–40 microns, and usually from 1–15 millimeters in length, made up of primary alumina particles of about diameter dimension. In such state, it can be readily subjected to conventional compacting and compression molding at room temperatures into coherent bodies useful as insulation materials and without recourse to binding or lubricating agents use to retain the particles of the compact together. Such compacting and molding can be effected under a pressure ranging from about 5 to about 5000 pounds per square inch or higher and preferably from about 80–200#/square inch for a resilient final product retaining such coherence after release of pressure and the particles being nonshifting under maintained pressure as applied during compression. When pressures ranging from, say, about 5–200#/square inch are used, a resilient, coherent heat insulating compact is obtained, while a ceramic-like material (from the standpoint of resiliency, hardness, etc.) results when compacting pressures above about 200#/square inch and to 5000#/square inch or higher are resorted to. The shaped compacts have a density of within the range of about 5–40#/cubic foot depending on the compressive force used, and the overall thermal conductivity, K, of the compact will be found to vary with the molding pressure. The effects of compacting pressures upon the alumina product of this invention to high coherency and low thermal conductivity are shown in the following table in comparison with other materials.

TABLE I

| Material | Pressure lbs./in.² | Density lbs./ft.³ | Thermal Conductivity, K[1] | Form After Release of Pressure |
|---|---|---|---|---|
| Alumina | 14.7 | 6.0 | .130 | Coherent Elastic. |
| Do | 100 | 10.1 | .118 | Do. |
| Do | 230 | 28.0 | .235 | Coherent Ceramic-like Do. |
| Do | 5,000 | 40.0 | .3 | Do. |
| Silica Aerogel | 100 | 11.2 | .144 | Disintegrated-Loose. |
| Glass Wool, 3#/ft.³ | 100 | 25.6 | .18 | Original density, resilient. |

[1] K=B.t.u., inch, Hr.⁻¹, ft.⁻², °F.⁻¹, at 100°–130° F. mean.

To a clearer understanding of the invention, the following specific examples are given. These are only illustrative and are not to be construed as limiting the underlying principles and scope of the invention.

*Example I*

In this example, microfibrous alumina was prepared in a reactor of the type shown in the accompanying drawing and was subsequently compacted to a coherent insulating material. The trough or heat transfer surface 11 used in this reactor consisted of a steel sheet 6″ wide and 30″ in length. Its reaction zone was heated to and maintained at about 150° C. by means of an oil burner disposed in the heating chamber. Initially, a charge of dilute liquid aluminum amalgam containing .006% by weight of aluminum was made up for use in the system by charging sufficient sheet aluminum to the dissolver section of the reactor in which sufficient mercury at about 150° C. had been previously fed. Upon formation of the desired amalgam charge, circulation of the charge through the entire system was undertaken by rotating the impeller element 16 at sufficient speed to obtain a continuous circulation of the amalgam at a rate of 2.5 gallons/minute which resulted in a lineal velocity of .17 ft./sec. of amalgam flowing through the reaction zone. A constant, unbroken stream of amalgam flow through the reaction zone and over its heat transfer surface and at a depth of about 2 mm. resulted. When the desired amalgam flow was established, excess oxygen containing 5 parts by volume of water vapor was continuously fed from port 13 and at a rate of 9 c.f.m. into the reaction zone and above the moving amalgam surface in a counter-current direction to the amalgam flow following which the gas was excited from the reaction zone through outlet 14. The aluminum of the amalgam reacted to form a growing mass in sheet or mat-like form of growing microfibrous alumina intermediate over the amalgam surface. The rate of formation was equivalent to utilizing .002 g./sec. of aluminum, equivalent to a production rate of .068 g. of $Al_2O_3$/sec./cm.², of reaction surface/hour. Due to the high recirculation rate of amalgam, the ratio of aluminum in the amalgam being consumed in the reaction zone to the total aluminum passing through that zone in amalgamated form was $$\frac{.002 \text{ g./sec.}}{.325 \text{ g./sec.}}$$

indicating a change on concentration of about 6% and a recirculation ratio of about 16.5. An orange-red sheet-like mass of microfibrous alumina and occluded and associated mercury oxides in the mol ratio $$\frac{(Al_2O_3)}{HgO}$$

of .3 was continuously formed over the moving amalgam surface. This mass grew thicker continuously, and after 5 minutes attained a height of about ⅙ of an inch. The alumina mass was then intermittently removed at five minute intervals from the amalgam surface by means of the scraper, and passed via chute 26 in ¼ to ½ square inch chunks, into the collector 27. The product analyzed 36% HgO, 58% $Al_2O_3$ and 6% $H_2O$ (when exposed to air). Upon transfer to a continuous rotary calciner and heating in air to 750° C. for 30 minutes, a final amorphous microfibrous product analyzing 99.9% $Al_2O_3$ resulted. It consisted of a microfibrous structure with its fibrils being in the order of 4 millimeters in length and .05 micron in diameter (as determined from electron micrographs), the individual microfine alumina particles being about the diameter of the fibrils. The density of the calcined product was 5.0 pounds per cubic foot. Upon mild disintegration without compacting its apparent bulk density was 2.5 pounds per cubic foot. When compacted at 100 p.s.i. in conventional molding equipment without use of a binder, its bulk density value was 11.6 pounds per cubic foot. Its excellent structural characteristics rendered the product useful as an insulation material.

*Example II*

Utilizing the same apparatus as was employed in Example I, a series of runs, listed below, were made from which a fibrous alumina intermediate was obtained which on calcination resulted in the pure amorphous microfibrous product having the properties shown in the following table. Except for the indicated variations, the same procedures were resorted to as were employed in Example I.

TABLE II

| Run No. | Percent Al in Amalgam | Temp. of Reaction, °C. | Composition of Gaseous Reactant (Percent by Volume) | | | Volume Gaseous Reactant, c.f.m. | Production Rate (Intermediate), GMS.-$Al_2O_3$/cm.² of HG Surfaces/Hr. | Product Character After Calc. at 850° C. for 30 Minutes | |
|---|---|---|---|---|---|---|---|---|---|
| | | | $O_2$ | $N_2$ | $H_2O$ | | | Character | App. Bulk Density, #/cu. ft. |
| 1A | .01 | 160 | 20.0 | 74.5 | 5.5 | .85 | .063 | microfibrous-amorphous. | 3.5 |
| 1B | .01 | 160 | 5.5 | 74.5 | 20.0 | .85 | .039 | do | 4.1 |
| 2A | .01 | 150 | 21 | 76.2 | 2.8 | .82 | .057 | do | 4.2 |
| 2B | .01 | 150 | 21 | 77.6 | 1.4 | .81 | .057 | do | 4.0 |
| 3A | .01 | 150 | 94.5 | none | 5.5 | .85 | .068 | do | 2.4 |
| 3B | .01 | 150 | 98.5 | none | 1.4 | .81 | .061 | do | 3.1 |
| 4A | .006 | 150 | air | air | 5.0 | | .034 | do | 2.5 |
| 4B | .01 | 150 | air | air | 5.0 | | .066 | do | 3.5 |
| 4C | .013 | 150 | air | air | 5.0 | | .096 | do | 4.4 |
| 5A | .02 | 150 | air | air | 5.0 | | | do | |
| 5B | .03 | 150 | air | air | 5.0 | | | do | |

*Example III*

To a compression molding device for molding flat 8 inch square panels, there was added 41.8 grams of microfibrous amorphous alumina produced in accordance with the procedure of Example I. The alumina had been disintegrated to the form of granules of about 16 mesh size and was compressed at 100 pounds per square inch without added binder to a coherent elastic flat panel ½ inch thick. The resulting panel had a density of 10.1 pounds per cubic foot and a thermal conductivity of .118 B.t.u./inch thickness/hour/square foot/° F. at a mean temperature of 100–130° F. The panel could be handled readily without breaking, was strong in compression and required the application of 100 pounds per square inch pressure to deform it beyond the elastic limit.

*Example IV*

Example III was duplicated except that the alumina granules were compressed at 14.7 pounds per square inch to provide a panel of 6 pounds per cubic foot density. This panel maintained its shape when the pressure was removed, was somewhat elastic, and had an overall thermal conductivity of .13.

A similar compression molding test was made, using the same pressure, but substituting a fine glass wool blanket for the alumina. The glass wool blanket was compressed from 1.1 pounds per cubic foot to 13.4 pounds per cubic foot but upon release of the pressure recovered its entire original volume.

*Example V*

To the compression molding device of Example III was added 117 grams of microfibrous amorphous alumina of granules of about 16 mesh particle size, and made up of parallelly arranged fibers less than .1 micron in diameter and having a length to diameter ratio exceeding 500. The alumina was cold pressed in such device at 230 pounds per square inch without additives to a coherent flat body approaching ceramic-like quality, ¼" thick, and having a density of 28 pounds per cubic foot, and a thermal conductivity of .235.

*Example VI*

In the compression molding device of Example III the same type of alumina granules were compressed at 5,000 pounds per square inch to give a panel of 40 pounds per cubic foot density. This panel was of a refractory ceramic quality, being hard, having a clear bell-like ring, being smooth surfaced and translucent. The overall heat conductivity was 0.3 (so-called "low density" 99% $Al_2O_3$ had a heat conductivity of 7.0 and a density of 90 pounds per cubic foot).

*Example VII*

An 8" x 8" x ¼₂" compact of microfibrous amorphous alumina was obtained by compression molding without binder the product from Example I. The compact had been compressed at 100 pounds per sq. in., and had a density of 10.1 pounds per cubic foot. The thermal conductivity was .118 B.t.u./inch/hour/square foot/° F. (at 100°–130° mean temp.).

The compact was encased in a 2 mil "Mylar" (polyethylene glycol terephthalate) envelope or closure using a thermoplastic seal. The closure was provided with a small opening valve and a hose connection utilizing the connection and valve. The enclosure was then evacuated to a pressure of .1 mm. of mercury which pressure was maintained indefinitely as a perfect readily attained seal. The enclosed panel could be freely flexed, showing an elastic recovery similar to that exhibited by tire tread rubber and much better than the enclosed compact of alumina. The overall thermal conductivity of the panel measured through the 8" x 8" surfaces of the panel was .045.

*Example VIII*

A compact of microfibrous amorphous alumina prepared in accordance with Example I was compressed to 4.65 pounds per cubic foot and covered with a 1 mil "Mylar" envelope, as described in Example VII. The air within the "Mylar" closure was then completely displaced by Freon (dichlorodifluoromethane). The overall thermal conductivity K of the product was .162 with air atmosphere which was decreased to .143 when the air was displaced by Freon.

*Example IX*

An 8" x 8" x ¼" compact of microfibrous amorphous alumina from Example I was encased in an envelope of aluminum foil laminated between "Saran" (polyvinyledene chloride) films and evacuated as described in Example VII. The panel obtained had higher flexibility than the initial compact as with the "Mylar" covered panel of Example VII and a thermal conductivity of .045.

*Example X*

An 8" x 8" x ¼" compact of microfibrous amorphous alumina prepared as described in Example VII was encased in a 26 gauge stainless steel envelope using solder to seal the edges and joints. A small opening, valve, and hose connection was provided for the enclosure which was then evacuated to .1 mm. of mercury. The panel, measured through the 8" x 8" surfaces, had an overall thermal conductivity of .045. The panel had an increased stiffness compared to the original compact.

While described as applied to certain specific embodiments, the invention is not restricted thereto. For example, while reaction zone temperatures ranging from about 100–200° C. have been mentioned as preferred, temperatures up to the boiling point of mercury are also contemplated for use. Similarly, while calcination temperatures of the order of 750–950° C. have been mentioned, calcination temperatures from 500°–950° C. can also be utilized. Again, though oxygen enriched with small amounts of water vapor comprises a preferred type of oxidizing gas reactant, air containing small amounts of $H_2O$ can also be used. Generally, the amount of water vapor present in or added to the oxidizing gas can range from 1 to 20%, by weight. The aluminum present in the amalgam must be in relatively dilute concentration. Thus, while a satisfactory aluminum product is obtained when the concentration of the aluminum in the amalgam is within a preferred range of .005 to .03%, in general, the aluminum concentration can range from .003% to 0.2%. A substantially constant concentration of aluminum in the amalgam is circulated to the reaction zone, such concentration being maintained by utilizing a high recirculation rate of aluminum amalgam. Preferably, from about 10 to 50 times as much amalgam is circulated as is utilized during its passage through the reaction zone. In this manner, the concentration is maintained substantially undepleted and within about 2 to 10% of the concentration of the amalgam entering into and passing through the reaction zone.

Similarly, the rate of circulation or throughput of gaseous reactants through the reaction zone is also maintained substantially constant and by circulating a large excess of the oxidizing gas reactant over the amount utilized in that zone. Thus, from about 20 to 50 times as much oxygen and water vapor is circulated over that actually used in the system.

The conditions of reaction are also maintained substantially constant throughout a period of continuous operation. Thus, uniform reaction temperature, uniform concentration of water and oxygen in the gas reactant, and substantially uniform concentration of aluminum in the amalgam advantageously provide the conditions requisite for uniform growth of the microfibrous structure on the surface of the amalgam and as long as the alumina is allowed to grow undisturbed thereon. Unexpectedly, the rate of growth will be found to be essentially constant regardless of the thickness of the alumina blanket formed on and completely covering the moving amalgam surface and as long as the aluminum concentration in the amalgam remains substantially constant and within the range mentioned. Below about .003% aluminum, the rate of formation is too slow for practical or economical operation falling off to zero, with the density of the product decreasing and presenting no practical structural strength. Thus, after approximately three minutes' retention time (employing the conditions of Example I), the length of the microfibers and therefore the thickness of the alumina blanket on the surface of the amalgam will be about 2 mm. After about five minutes, it will be about 5 mm. The blanket will continue to grow in thickness at this rate rendering it readily possible to form blankets up to 10 and 20 mm. or greater in thickness. Preferably, the alumina blanket is maintained in a stationary position over the moving amalgam bath and until the desired thickness is reached. If desired, and by utilizing a longer reaction surface, growing of the alumina can be effected while it is being moved lineally and at a rate approaching that of the lineal velocity of the moving amalgam reaction surface.

All of the reactants are continuously furnished to the reaction zone and in great excess compared to the quantity reacted. By this means constant reaction conditions prevail, in that the concentrations of the reactants do not vary appreciably as circulated through the reactor. Even though all reactants are in excess, the composition of the reactant gas stream is significant. No reaction, or an undesired product is obtained if water vapor or oxygen is completely absent. If desired, nitrogen or other inert gas such as the rare gases (argon, helium) may be used as diluents.

While the mechanism of the reaction whereby my novel coherent alumina product is grown on a rapidly moving surface of mercury amalgam is not presently completely understood, it has been found that:

(1) Maintaining the temperature of the reaction surface at 80° C. provides very little growth on the amalgam and results in a final reaction product consisting of a weakly coherent mass which is wholly different than that obtained in my invention. Such mass is colorless or gray and contains only occluded mercury which vaporizes off at low temperatures (300–500° C.).

(2) At a reaction surface temperature of 150° C., the reaction of the moving amalgam with steam or water vapor alone in the absence of substantial oxygen, results in a silvery film on the surface of the amalgam which stops the reaction. Such product shows no fibrous characteristics and becomes crystalline when calcined.

(3) With oxygen as the only gaseous reactant, and in the absence of less than about 1% by volume (compared to oxygen) of water vapor, a skin forms on the surface of the moving amalgam which prevents further access of the gaseous reactants to the amalgam. Furthermore, even in the presence of oxygen, more than 20% by volume of water gives a product having high bulk density, and very low structural strength when compacted, has no appreciable fibrous character, and tends to be crystalline.

(4) The fiber strength, as judged by the inherent structural strength and density of the fibers, is markedly increased as the temperature of the reaction surface is raised through the range of 100–200° C. This is shown by the increasing strength of the compact formed before or after removing the mercury compounds by heating to 750–950° C. This change is accompanied by a corresponding increase in the amount of occluded and associated oxygen compounds of mercury found in the fibrous alumina intermediate. The increase in occluded oxygen compounds of mercury is shown by a change in the color of the alumina intermediate grown on the moving amalgam reaction surfaces. As the temperature and time of contact increases, the color of the intermediate becomes darker, changing from yellow to orange red and the product has a greater combined mercury content. The combination or association of an appreciable proportion of the mercury in the form of an oxide or oxide hydrate with the alumina in some form is apparent since it is well known that decomposition of mercuric oxide is complete at 500° C.

As illustrated in Examples 7–10, evacuated or other desired forms of insulating structures or panels having very low thermal conductivity can also be prepared from my novel, non-crystalline microfibrous alumina product to provide improved insulating properties. Thus, the insulating structure can comprise two spaced walls of an impervious, thin-walled material welded together at their edges to provide a sealed envelope within which a compression-molded, coherent compact of particles of microfibrous amorphous alumina is disposed with an atmosphere of lower thermal conductivity than air being maintained within the enveloping material so that its thermal conductivity characteristics will be maintained at a very low value over prolonged periods of use. The closure material preferably consists of an impervious, flexible film or sheeting material such as those mentioned in the examples, aluminum foil, laminated aluminum foil, metal-laminated polyethylene film, thin sheet metal (about 26 gauge or thinner), etc. The flexible thin-walled material can be formed about a coherent shape of the alumina compacted to such shape by pressure molding and without recourse to binding agents of any kind. Various, conventional-type methods for forming the closure can be used, depending upon the type of closure material employed. For example, when the closure element comprises a thermal plastic material, such as "Mylar," it can be readily heat sealed while, when stainless steel sheeting is employed, recourse to soldering to procure the necessary non-leaking seams is resorted to.

The gaseous atmosphere within the closure element can be provided at the time encasement of the alumina is effected, and by means of a suitable closure machine operating under vacuum, or in an atmosphere of argon, helium, or other suitable inert gas adapted to displace air present in the voids of the compact. Alternatively, a connecting tube and valving or sealing means for effecting evacuation, and, if desired, replacement of the displaced air with gas having a lower thermal conductivity than air can be used. Examples of useful gases include argon, helium, ethylene, propylene, carbon dioxide, nitrous oxide, sulfur dioxide, a "Freon" such as dichlorodifluoromethane, and the like. While desired improvement in thermal conductivity is obtained by reducing the pressure within the compact to any degree below atmospheric pressure, preferably, and to obtain optimum benefits herein, a pressure within the range of from about .01 to 10 mm. of mercury is resorted to.

As already noted, the compacting of the insert employed in the flexible enveloping means can be effected by recourse to commercial compression molding techniques. Since no binder or lubricating material need be employed in the compacting, the increased conductivity which would result from coating the alumina with binders is advantageously eliminated. Also, the absence of any binder use permits molding to be readily effected at room temperatures.

The insulating panels of compacted amorphous alumina in an impervious enclosure affords several advantages over prior insulating structures, e.g., insulating bodies with extremely low heat conductivity are obtained which are lighter in weight and in many cases more elastic than other materials of comparable insulating value. Covering and heat sealing with thermoplastic films proves extremely difficult when attempts are made to employ other comparable materials, such as glass or silica wool, due to the sharpness of the fiber ends which puncture the film or interfere with the sealing. These difficulties are effectively avoided with my novel microfibrous amorphous alumina product.

Again, due to the elasticity of panel structures containing my alumina product, they can be easily formed into many shapes and are therefore readily employable in those applications where specially made shapes or forms for individual objects being insulated are required. Due to the impervious covering of the compact and its controlled atmosphere, no loss of insulating quality can result from moisture or other conditions which could be detrimental to highly absorptive types of insulating materials. Furthermore, because of the improved thermal insulating properties exhibited by the panel structures, the latter are readily adapted for use in the walls of household refrigerators and the like where thinner insulating walls and greater interior space are a prerequisite. The extremely small particle size of the microfibrous alumina employed in such panels results in a port size in the insulation approximating the mean free path of air at ordinary atmospheric pressure. In consequence, higher pressures can be tolerated in the envelope than is the case with coarse fibers, such as glass, and the manufacture of the panels becomes greatly simplified. As compared to spherically shaped powders of the same diameter, the alumina supports the weight of the atmosphere at a lower density, is easily fabricated due to ability to be preformed by compression molding, and is not subject to shifting or disintegration during use.

Furthermore, the elasticity of the lower density products will be found to be advantageous in that moderate deflections of the shapes can be made when it is used to insulate unevenly shaped objects or surfaces. This affords material saving costs when installed for insulating purposes. Its resistance to chemical change, due to changes in temperature, or to corrosive gases, provides a product having a combination of qualities not found in other structural insulating materials, whether in bat or solid form. The relatively high insulating value of the more highly compressed products having a ceramic quality, at a density only about 17% the theoretical density of alumina, make the product highly useful also as a high temperature refractory and as a ceramic material.

I claim:

1. A process for preparing microfibrous alumina which comprises reacting at an elevated temperature ranging from about 100° C. to the boiling point of mercury within a reaction zone a water-containing oxidizing gas with a flowing stream of a constant dilute liquid aluminum amalgam the aluminum concentration of which ranges from .003% and not to exceed 0.2% by weight, during said reaction maintaining a layer of a coherent, fibrous alumina intermediate mass interposed between said oxidizing gas and on or in direct contact with said amalgam stream until said mass is made up of parallel fibrils growing vertically from the supporting stream surface, and removing the alumina product from said zone.

2. A process for preparing microfibrous alumina comprising reacting at an elevated temperature ranging from about 100° C. to 200° C. within a closed reaction zone a water-containing oxidizing gas with a continuously flowing stream of a dilute liquid aluminum amalgam maintained at a substantially constant concentration in which the aluminum concentration ranges from .003% and not to exceed 0.2% by weight throughout the reaction, during said reaction growing and maintaining a coherent layer mass of a fibrous alumina intermediate in said zone on the surface of and in direct contact with said stream and between said oxidizing gas and amalgam stream, continuing said contact until said mass is made up of parallel fibrils growing vertically from the supporting stream surface, and thereafter removing the microfibrous alumina product from said zone for recovery.

3. A process for preparing a pure microfibrous alumina product comprising reacting at an elevated temperature ranging from about 100° C. to 200° C. within a reaction zone a water-containing oxidizing gas with a continuously flowing stream of a dilute liquid aluminum amalgam maintained at a substantially uniform, constant concentration in which the aluminum concentration ranges from .003% and not to exceed 0.2% by weight during said reaction, growing a layer mass of a stationary, coherent, fibrous alumina intermediate on the surface of and in direct contact with said stream and between said oxidizing gas and amalgam stream, continuing said contact until said mass is made up of parallel fibrils growing vertically from the supporting stream surface, continuously supplying said reactants to said zone in large excess over the quantity required for reaction, and periodically removing the alumina product from said zone for recovery.

4. A process for producing microfibrous amorphous alumina comprising reacting at an elevated temperature ranging from about 100° C. to 200° C. within a reaction zone, an oxygen- and moisture-bearing gas with a rapidly moving stream of dilute liquid aluminum amalgam maintained at a substantially uniform, constant concentration in which the aluminum concentration ranges from .003% and not to exceed 0.2% by weight, forming and maintaining between said gas and moving stream a growing body of alumina intermediate on the surface of and in direct contact with said moving amalgam throughout the reaction of said oxygen- and moisture-bearing reactant gas and said amalgam stream, continuing said contact until said body is made up of parallel fibrils growing vertically from the supporting stream surface periodically removing the alumina intermediate formed from said moving stream, heating the removed intermediate to a temperature sufficient to remove therefrom occluded and associated mercury-oxygen compounds present therein and recovering the resulting pure amorphous microfibrous alumina product.

5. A process for producing microfibrous alumina comprising reacting at temperatures ranging from about 100–200° C. within a reaction zone a water-containing oxidizing gas with a continuously flowing stream of a dilute liquid aluminum amalgam maintained at a substantially constant aluminum concentration of from .003% to 0.2%, during said reaction maintaining a layer mass of a coherent, fibrous alumina intermediate over and in direct contact with the surface of said flowing amalgam and below said oxidizing gas, continuing said contact until said mass is made up of parallel fibrils growing vertically from the supporting stream surface employing a constant lineal flow of amalgam through said zone ranging from about .05 to 50 feet per second, periodically removing the alumina intermediate formed in the reaction zone from the surface of said amalgam, heating the removed product to temperatures ranging from about 750–950° C. in the presence of air to remove therefrom occluded and associated mercury-oxygen compounds, and recovering the resulting pure, amorphous microfibrous alumina product.

References Cited in the file of this patent

UNITED STATES PATENTS

| | | |
|---|---|---|
| 2,067,015 | Munters | Jan. 5, 1937 |
| 2,274,634 | Heard | Mar. 3, 1942 |
| 2,371,880 | Delloye | Mar. 20, 1945 |
| 2,643,935 | Halversen | June 30, 1953 |
| 2,699,415 | Nachtman | Jan. 11, 1955 |
| 2,742,115 | Strong | Apr. 17, 1956 |
| 2,746,842 | Bloch et al. | May 22, 1956 |
| 2,779,066 | Gaugler et al. | Jan. 29, 1957 |
| 2,787,522 | Lefrancois | Apr. 2, 1957 |

OTHER REFERENCES

Jourdain: Comptes Rendus, vol. 150, pages 391–394 (1910).